United States Patent
Leland

[15] 3,652,913
[45] Mar. 28, 1972

[54] CONTROL SYSTEM INCLUDING COMMON MODE FEEDBACK

[72] Inventor: Robert D. Leland, Southfield, Mich.
[73] Assignee: George M. Holley, Jr., Grosse Pointe Shores, Mich.
[22] Filed: July 1, 1970
[21] Appl. No.: 51,627

[52] U.S. Cl. ................................. 318/678, 318/681, 330/69
[51] Int. Cl. ........................................................... G05f 1/00
[58] Field of Search ........................... 318/678, 681; 330/69

[56] References Cited

UNITED STATES PATENTS

| | | | |
|---|---|---|---|
| 3,260,912 | 7/1966 | Gregory | 318/678 X |
| 3,471,759 | 10/1969 | Broverman | 318/678 X |
| 3,525,029 | 8/1970 | Joslyn et al. | 318/681 X |

*Primary Examiner*—Benjamin Dobeck
*Attorney*—Burton and Parker

[57] ABSTRACT

In a differentially operating control system a common mode feedback circuit is described which provides automatic compensation of the quiescent operating point despite variations in component values and semiconductor parameters. The circuit is illustrated in a control system for differentially operating a load, such as a DC motor, in accordance with the difference between a pair of input signals to accurately position the shaft of the motor in respect of such difference.

6 Claims, 4 Drawing Figures

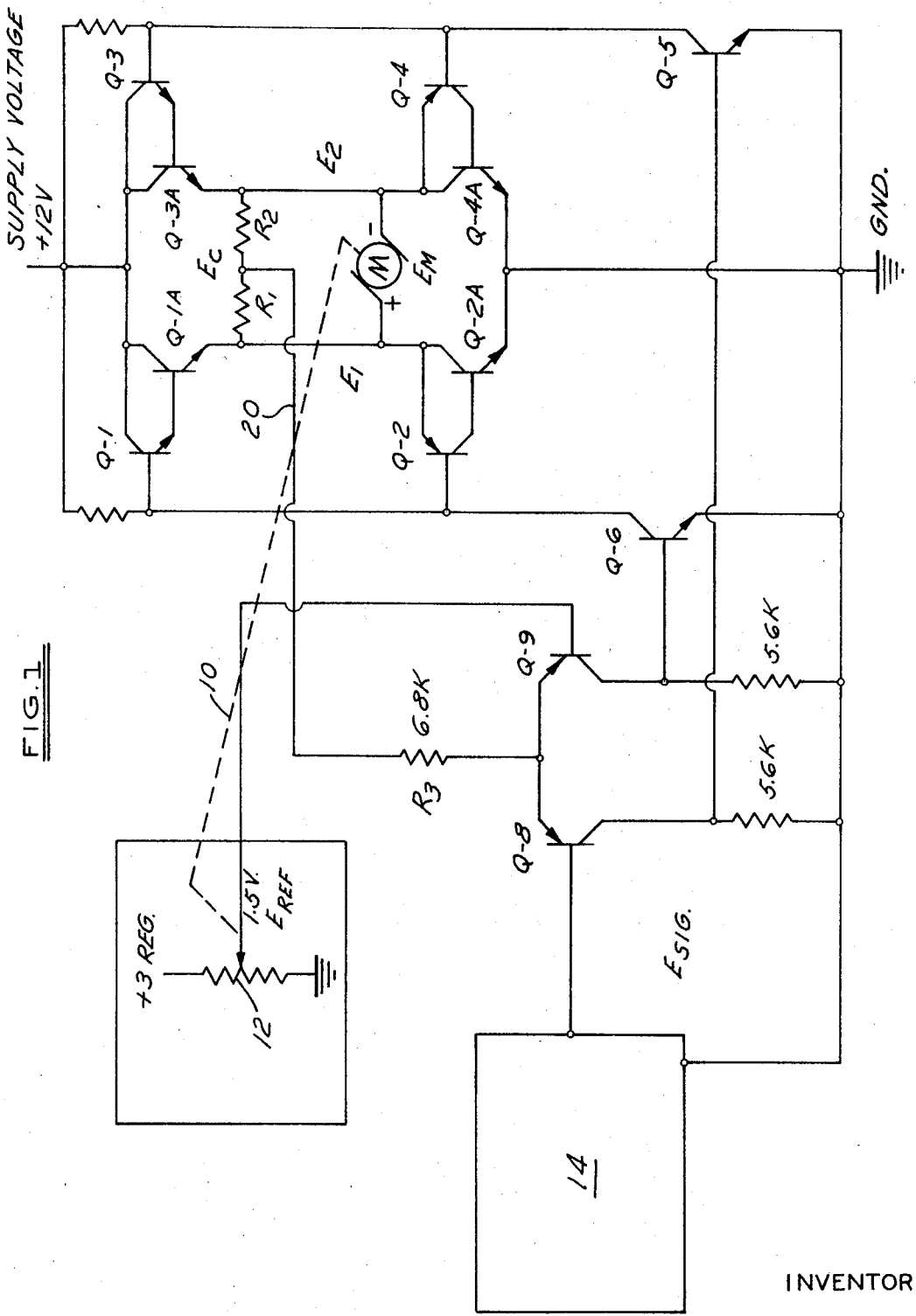

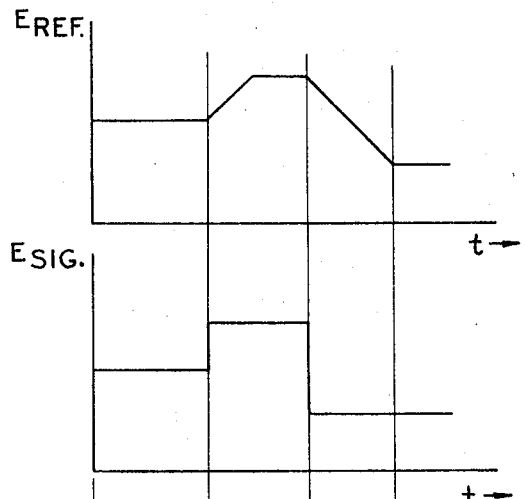
$$E_M = E_1 - E_2$$
$$12v = K_1 = E_1 + E_2$$
$$E_C = \frac{E_1 + E_2}{2} = K_2 = 6v$$
AT POSITION
$E_{SIG} - E_{REF} = 0$ (ERROR)
DIFFERENTIAL GAIN = $A_0$
$$E_M = A_0 \left[ E_{SIG} - E_{REF} \right]$$
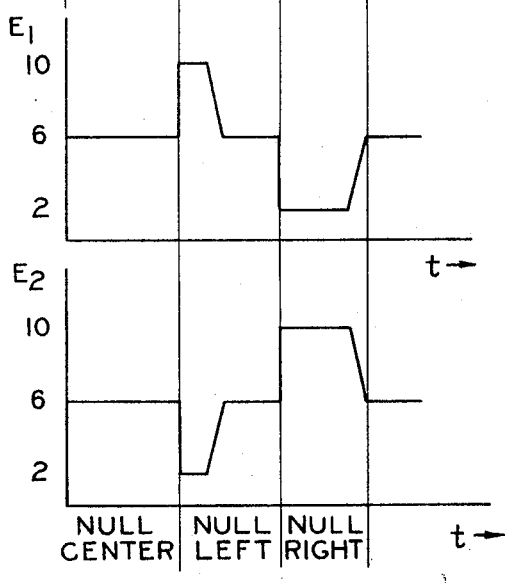
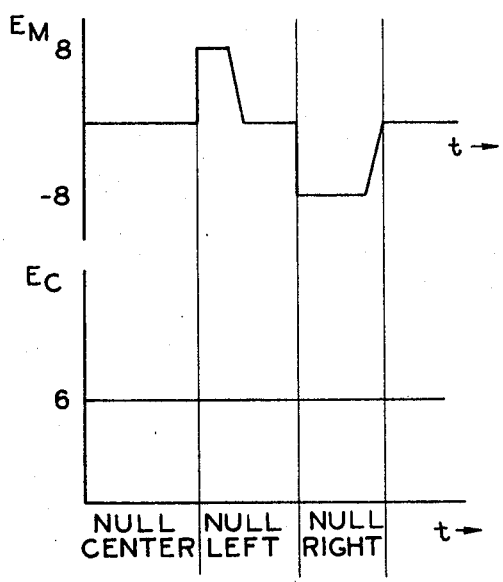

CONTROL SYSTEM INCLUDING COMMON MODE FEEDBACK

FIELD OF INVENTION

This invention relates to electric control circuits particularly, though not exclusively, suited to accurately reversibly control the shaft position of a DC motor in accordance with an actuating signal.

BACKGROUND OF THE INVENTION

In U.S. Pat. No. 3,419,866 there is disclosed a system for controlling the shaft position of a DC motor in an automatic marine pilot. Further refinements of such system are shown in U.S. Pat. applications Ser. No. 730,204 filed May 17, 1968, and Ser. No. 872,060 filed Oct. 29, 1969. In the latter the control is effected utilizing a semicon          ntrol circ.. comprising a differential amplifier having a pair of output circuits and a pair of power amplifiers which are coupled between such output circuits and the motor to operate the motor in push-pull relation in one direction or the other in accordance with the algebraic difference between the output circuits of the differential amplifier. While such circuit is functional it is well known to those skilled in the art of circuit design that variations of four-to-one in transistor $H_{fe}$ are common from transistor to transistor and precautions must be taken to compensate circuit performance in view of this variation. As a consequence, it is desirable to eliminate the effects in the circuit of Ser. No. 872,060 arising from the aforementioned variations. It will be apparent to those skilled in the art that the solution disclosed herein is not limited to marine auto pilot control systems but is of general application.

It is the primary object of the invention to minimize the effect of variations in component values and semiconductor parameters in a differentially operated load responsive to the algebraic sum of the output signals of a differential amplifier.

SUMMARY OF THE INVENTION

In carrying out the invention I provide a negative feedback (or common mode input) to the input of the differential amplifier, which feedback is responsive to variations in the common mode operating point of the power amplifiers and thereby serves to attenuate the common mode gain of the power amplifiers to stabilize the load control circuit.

More specifically, the differential amplifier has a pair of output circuits which provide a pair of output signals whose algebraic sum is utilized through a pair of power amplifiers direct-coupled between such output circuits and opposite sides of the motor to cause the motor to operate in one direction or the other. Motor shaft position information comprises one input signal to the differential amplifier and a reference or actuating signal with which motor shaft position is compared provides a second input signal thereto. A circuit connected across the power amplifiers and back to the input of the differential amplifier senses the common mode operating point of the power amplifiers and provides a negative feedback to the differential amplifier. Such feedback reduces the common mode gain of the differential amplifier to unity while the differential gain remains high. As a result, any variation in the quiescent value of the voltages impressed on opposite sides of the motor by the power amplifiers arising from transistor $H_{fe}$ variations, is greatly reduced.

DESCRIPTION OF THE DRAWINGS

FIG. 1 is a schematic diagram of a circuit embodying the invention; and

FIG. 2, 3 and 4 show illustrative relationships between motor actuating voltage and signal input.

DESCRIPTION OF THE INVENTION

In the drawing a direct current motor M is to be controlled. In a marine pilot application the motor may be connected to a vessel's rudder as illustrated in U.S. Pat. No. 3,419,866. Rudder position in response to motor operation is sensed by a feedback system schematically shown and described in such patent and in the present drawing depicted by a dash line 10 which connects with the moving contact of a potentiometer 12 to provide an input rudder or motor shaft position feedback signal to the base of transistor Q-9. Another input signal is delivered to the base of transistor Q-8 by, for example, a radio receiver 14 which corresponds with the receiver 12 and amplifier 14 of said patent. The signal to the base of transistor Q-8 serves as what may be termed the actuating signal.

The circuit performs as a class-one position servomechanism where the actuating and position feedback signals are compared at the differential inputs of the differential amplifier Q-8 and Q-9. The motor M will be actuated to run in the prescribed direction until zero error exists between the actuating and feedback signals. The differential outputs of Q-8 and Q-9 are amplified by Q-6 and Q-5 and applied to a pair of power amplifiers comprising transistors Q-1, Q-2 and Q-3, Q-4. The two power amplifiers are quasi-complementary and of conventional design and are connected to the motor M to operate it in push-pull in either direction of rotation in response to the differential actuating and feedback signal voltages at the input of the differential amplifier Q-8, Q-9.

The differential treatment throughout the entire design provides motor actuation independent of power supply voltage at null. This feature is important in that in many applications, such as in marine pleasure craft, the supply voltage may vary from ten to fifteen volts. Referring to FIGS. 2, 3 and 4 I have shown five curves as follows:

$E_{ref}$ which is the input feedback voltage from potentiometer 12 to Q-9;

$E_{sig}$ which is the input actuating voltage from 14 to the base of Q-8;

$E_1$ which is the voltage impressed by power amplifier Q-1, Q-2 on one side of the motor M;

$E_2$ which is the voltage impressed by power amplifier Q-3, Q-4 on the other side of motor M; and $E_M$ which is the algebraic sum of voltages $E_1$ and $E_2$. The curve $E_C$, shown as a straight line in FIG. 4 represents the common mode operating voltage. These curves will facilitate the analysis of the system. The voltages noted in the curves are referenced to the voltages shown in FIG. 1. All voltages except for $E_M$ are with reference to ground potential.

In analyzing the circuit, assume that the motor actuating voltage $E_M$ is zero so that the circuit is at null, and the reference $E_{ref}$ and signal $E_{sig}$ voltages are at the same quiescent value. The curves are shown in three parts or columns, viz., Null Center, Null Left and Null Right, and in the condition assumed, the Null Center part of the curves illustrates the quiescent condition. Assume now that the $E_{sig}$ voltage increases, as would occur if the vessel wanders off course to say port, and remains at a steady increased voltage as illustrated in the column Null Left. The amplification and differential phasing causes $E_1$ and $E_2$ to respond as a step voltage where $E_1$ increases and $E_2$ decreases to saturation values of arbitrarily chosen values of 10 and 2 volts respectively. The algebraic sum of $E_1$ and $E_2$ becomes $E_M$ equal to +8 volts. As the motor M responds to the signal, the feedback system 10 to the potentiometer 12 causes $E_{ref}$ to increase to the same value as $E_{sig}$ and the motor stops. The Class-one servomechanism predicts that the differential error between $E_{ref}$ and $E_{sig}$ will be zero neglecting Columb friction and thus very accurate positioning of the motor shaft may be achieved. Column Null Right shows the effect of a reverse command.

It will be appreciated that while the null values of $E_1$ and $E_2$ have been shown at 6 volts (because the power supply is shown at 12 volts), there are numerous other values ranging from zero to the full supply voltage. Because the motor M responds to the difference in these voltages, the symmetry of the circuit indicates that temperature and supply voltage is likely to cause the same change in $E_1$ and $E_2$ with an algebraic difference in voltage of zero. Consequently the system is independent of common mode voltage variations. The gain characteristics of the transistors is, however, dependent upon the quiescent value of $E_1$ and $E_2$ and ideally these voltages should be equal at one-half of the supply voltages to provide maximum linear excursion of the differential motor voltages $E_1$ and $E_2$.

The absolute values of $E_1$ and $E_2$ are highly dependent upon the gain characteristics of the transistors which vary from transistor to transistor and vary with temperature. The circuit shown provides means for sensing the common mode operating point of the power amplifiers independent of differential gain and circuit differential voltages and provides a negative feedback to the input of the differential amplifier Q-8, Q-9, thereby reducing the common mode gain of the amplifier to unity while the differential gain remains at a high value. This reduction in common mode gain greatly reduces the variation in the quiescent value of $E_1$ and $E_2$ due to all component variations. Such means for sensing the common mode operating point and providing a negative feedback comprises a sum circuit of resistors $R_1$ and $R_2$ connected across the motor between $E_1$ and $E_2$ with a conductor common to the resistors extending to the resistor $R_3$ which is common to the emitters of transistors Q-8 and Q-9.

Absolute values of $E_1$ and $E_2$ are obtained by the sum circuit of R1 and $R_2$. The voltage $E_c$ represents the direct sum of $E_1$ and $E_2$ and as shown in FIG. 4 is independent of differential values. $E_c$ is the average of $E_1$ and $E_2$ and exactly one-half of the supply voltage, which is the most desirable. (See formulas to right of FIG. 2). The existence of negative feedback as a result of connecting $E_c$ back to the common emitters of Q-8 and Q-9 through the resistor $R_3$ is illustrated as follows. Assume $E_c$ tends to rise above its nominal 6 volt value. This will cause both Q-8 and Q-9 to conduct more current which in turn will cause Q-5 and Q-6 to conduct more collector current in turn causing the collector-emitter voltage of Q-5 and Q-6 to drop. The quasi-complementary symmetry transistors Q-1, Q-2, Q-3 and Q-4 are actually compound emitter followers so that a reduction in their base voltages leads to a reduction in $E_1$ and $E_2$ and a reduction in $E_c$ opposing the initial rise.

The closed loop common mode gain is a function of one-half the differential gain and the feedback elements attenuation. It is possible from feedback theory to predict unity common mode gain with feedback without at the same time a reduction in the differential gain. While the design objective is met with the disclosure, a compromise is required in the selection of resistor $R_3$. The differential amplifier design requires a high value of $R_3$ while the feedback requires a low value but a mean value of $R_3$ provides more than adequate performance of both objectives.

While the embodiment disclosed has been specifically applied to use in a marine automatic pilot, it will be appreciated by those skilled in the art that the invention has many other applications. The specific circuits shown are merely illustrative and others can be developed which will effect the same function without departing from the spirit of the invention.

What is claimed is:

1. A control system for differentially operating a load in accordance with the difference between a pair of input signals comprising, in combination:

a differential amplifier responsive to the pair of input signals and having a common mode input circuit and a pair of output circuits providing a pair of differential output signals, a pair of power amplifiers each direct-coupled between one of said output circuits and one side of the load to be controlled to operate the load in accordance with the algebraic sum of the output signals of the differential amplifier, and means connected to the power amplifiers to provide a common mode operating point therefor and connected to the common mode input circuit of the differential amplifier to provide a negative feedback therebetween to attenuate the common mode gain of the power amplifiers.

2. The invention of claim 1 characterized in that said means for providing a common mode operating point comprises a resistor adding network connected across the outputs of the power amplifiers.

3. The invention defined in claim 1 characterized in that said amplifiers provide direct current amplification.

4. The invention as defined in claim 1 characterized in that a load is included in and is a part of the circuit.

5. The invention defined by claim 4 characterized in that said load is an electromechanical energy converter.

6. The invention defined by claim 2 characterized in that an electromechanical energy converter is included in and is a part of the circuit.

* * * * *